United States Patent [19]

Steere et al.

[11] Patent Number: 5,200,073
[45] Date of Patent: Apr. 6, 1993

[54] POLYMERIC FILM FILTER ASSEMBLY

[75] Inventors: William C. Steere, Grass Lake; Jeff Lucas, Ypsilanti, both of Mich.

[73] Assignee: Gelman Sciences Inc., Ann Arbor, Mich.

[21] Appl. No.: 739,279

[22] Filed: Aug. 1, 1991

Related U.S. Application Data

[63] Continuation-in-part of Ser. No. 659,581, Feb. 22, 1991, Pat. No. 5,104,536.

[51] Int. Cl.$^5$ .............................................. B01D 61/18
[52] U.S. Cl. .............................. 210/232; 210/321.86; 210/446; 210/464
[58] Field of Search ................... 210/321.86, 446, 464, 210/474, 482, 232; 55/377

[56] References Cited

U.S. PATENT DOCUMENTS

| | | | |
|---|---|---|---|
| 3,506,130 | 4/1970 | Shaye | 210/436 |
| 3,675,780 | 7/1972 | Marshall et al. | 210/446 |
| 3,937,621 | 2/1976 | Gravley | 55/377 |
| 4,035,304 | 7/1977 | Watanabe | 210/317 |
| 4,265,760 | 5/1981 | Abel et al. | 210/282 |
| 5,104,536 | 4/1992 | Steere et al. | 210/321.86 |

OTHER PUBLICATIONS

Norton Co., 1989 "Pressurized Bailer System for Field Sample Filtration".

Primary Examiner—Frank Spear
Attorney, Agent, or Firm—Krass & Young

[57] ABSTRACT

A flexible inflatable polymer film filter assembly or device is provided in pouch or sleeve form for filtration of fluid comprising at least one fluid porous dead-end filter panel located internally within the pouch or sleeve with the opposite end edges of the filter panel sealed respectively to first and second polymer film fluid-barrier panels that form the pouch or sleeve so that the respective pouch or sleeve is divided into separate internal chambers, one of which may serve for collection of permeate fluid. The device has a flat two-dimensional form when empty but can assume an inflated three-dimensional form when containing fluid under pressure. The device being constructed of sterilizable thin plastic film, can be cut into transverse segments (for purposes of analysis, further processing, etc.) which can be a segment comprising each filter panel or a segment containing a liquid or non-liquid fluid permeate. The assembly optionally includes a hollow vessel support member for supporting the filter device vertically for gravity flow or forced flow of liquid to be filtered, especially in the laboratory or in the field.

21 Claims, 7 Drawing Sheets

POLYMERIC FILM FILTER ASSEMBLY

PRIOR APPLICATION

This is a continuation-in-part of U.S. Pat. application Ser. No. 659,581 filed Feb. 22, 1991, now U.S. Pat. No. 5,104,536.

FIELD OF THE INVENTION

This invention concerns polymeric film filter assemblies and, more particularly, fluid inflatable pouch-like or sleeve-like dead-end filter assemblies which are useful for macro- and micro-filtration of aqueous and non-aqueous fluids.

BACKGROUND OF THE INVENTION

Assemblies or packages for filtering fluids introduced therein are well-known in the art. One such package described in U.S. Pat. No. 3,092,249 employs a container made of air impervious material and has therein an opening or mouth closed by an air sterilizing filter so that the only ingress for air to enter the container is through the filter. Another apparatus described in U.S. Pat. No. 4,777,137 employing a complex tubular sleeve, the bottom of which is closed by a sterile microporous member filter sealingly fixed on its periphery to one end of the sleeve is used to collect and filter a liquid sample to be tested. This is done so that the downstream side of the filter can be contacted with a culture medium for purposes of counting living microorganisms contained in the liquid sample. A similar apparatus is described in U.S. Pat. No. 4,640,777. Another assembly described in U.S. Pat. No. 4,702,834 for filtering liquids employs a plastic laboratory filterware comprising upper and lower chambers separated by a neck portion which includes a plastic support plate. A cellulose nitrate filter membrane is ultrasonic welded to the support plate for filtering liquids through the neck portion. The assembly is a bulky rigid structure, however, and is uneconomical for one-time use. Another pre-sterilized bag assembly in association with a sterilizing microporous filter described in U.S. Pat. No. 4,964,261 employs a flexible sterile tubular bag with a single inlet for introducing sterile solutions but the microporous filter is located outside of the bag.

OBJECTS OF THE INVENTION

It is an object of the invention to provide an economical lightweight unitary polymer film sleeve filter device for filtering a stream of liquid or gaseous fluid therethrough and optionally for collecting the filtered fluid in the device.

It is a further object to provide a fluid filter device constructed of lightweight polymeric film that is inflatable into separate chambers from a planar two dimensional geometry to a three dimensional hollow sleeve or bag geometry in which the separate chambers are partitioned by interior dead-end filter panel means.

Another object is to provide a single-use sterile polymeric film filter tube device containing dead-end sterilizing filter membrane means therein for sterilizing aqueous fluid flowing therethrough and optionally collecting the thus sterilized fluid in the device while maintaining it within a sterile chamber.

These and other objects, features and advantages are realized from the following description of preferred and best mode embodiments of the invention.

SUMMARY OF THE INVENTION

The filter device of the invention in a preferred embodiment comprises a fluid porous dead end filter panel between first and second polymer film fluid-barrier panels, preferably transparent, forming together an open-ended fluid-inflatable hollow unitary pouch or sleeve. As will be seen, in an embodiment where the first and second fluid-barrier panels are separate panels the device is in sleeve form and where the first and second panels are formed by folding a single long panel in half upon itself (i.e., are unitary), the device is in pouch form. The filter panel has spaced apart first and second transverse end edges located in the pouch or sleeve with the first transverse end sealed to the first polymer film panel and the other transverse end sealed to the second polymer film panel. Thus the filter panel crosses over from one panel to the other panel. In this way the pouch or sleeve interior is fluid-sealingly partitioned by the filter panel into two chambers—a first chamber for receiving axial flow of a fluid to be brought into contact with the upstream surface of the filter panel and to pass therethrough and be filtered thereby and a second chamber for receiving the permeate fluid through the downstream surface of the filter panel. The filter panel and the polymer film panels which together form a fluid-tight pouch or sleeve can be constructed in any suitable way but preferably are formed in side-edge-sealed sandwich relation. The resulting device in sleeve form has a first open ingress end and a second open exit end and in pouch form has an open ingress end. In either form, the device may be provided with suitable closure means such as a transverse clamp, weld seal, tape or cover sealing the one open end or both the first and second open ends, as the case may be. The open ingress end in a preferred embodiment is formed in a fan or funnel shape as described below. Preferably, the filter device is sterilized by suitable means such as gamma radiation, autoclaving, treating with ethylene oxide, or the like. The filter panel may comprise a membranous or non-membranous filter panel material or may combine both materials, e.g. with the latter material laminated as a prefilter to the former material. The membranous material may be a hydrophilic membrane or a hydrophobic membrane and may be macroporous or microporous, and more preferably is a polymeric microporous membrane material. The mean pore sizes for suitable microporous membranes is not critical and for example may be between 0.01 $\mu$m and 10 $\mu$m. Microporous membranes have found widespread use in removing fine particulate matter such as dust and bacteria from liquids and gases. Examples of suitable membranes are nylon, nitrocellulose, mixed esters of cellulose, polycarbonate, polyethersulfone, acrylic copolymer and other similar membranes, unsupported or supported by a polyester web or fabric, laminated polypropylene web support or other support which may be per se conventional.

Suitable nonmembranous porous materials are woven and nonwoven fabrics, glass fiber mats, melt blown mats, felts, and the like. These porous nonmembranous materials can be used as a filter panel material or as a prefilter for the present membranous filtrations.

The filter device of the invention in a preferred embodiment has a planar two dimensional geometry. This form has a space saving advantage for purposes of packaging, warehousing, distribution, etc. The device however is usefully inflatable by introducing either aqueous or non-aqueous fluid, under pressure. In the case of aqueous fluid, for example, this may be done by pressure of gravity, via the first open, upstream end of the device and allowing the fluid to flow downward into the first chamber whereupon the device gradually inflates to a three dimensionally hollow geometry enabling the fluid to gravitate to, and have direct contact with the filter panel for filtration in due course.

The invention contemplates a preferred embodiment of the filter device comprising at least two dead-end filter panels axially spaced apart in the sleeve device whereby the sleeve interior is partitioned into corresponding upstream and downstream chambers. The volume capacity of such chambers is selected so that each downstream chamber is large enough to accommodate the flow of permeate from its upstream chamber.

In a further preferred embodiment of the multichamber device described, the porosity of each filter panel is selected such as to provide a graded series of decreased average porosity per panel thereby avoiding undue blockage at each panel by overly large particulates and enabling collection of the desired permeate as well as size-graded particulates from each of the respective upstream chambers.

The invention in another aspect concerns one preferred method embodiment of forming a tubular filter device comprising a filter panel having first and second side edges and first and second transverse end edges in layered relation between first and second polymer film barrier panels having first and second side edges corresponding to said filter panel first and second side edges. The method comprises joining the first transverse end edge of the filter panel by weld means with the first barrier panel; joining the second transverse end edge of the filter panel by weld means with the second barrier panel; joining the respective first side edges of the filter panel, first barrier panel, and the second barrier panel by weld means; and joining the respective second side edges of the filter panel, the first barrier panel, and the second barrier panel by weld means. For this purpose, the means of welding may be conventional means such as adhesive sealing, taping, heat sealing, hot wire sealing, ultrasonic sealing, and the like. The placement and welding of the respective panel is suitably done in four cycles: first, the filter panels according to one preferred embodiment is superposed on the first barrier panel at a position intermediate or midway of the length thereof and its first transverse end is welded to that barrier panel; next, the reverse side of the filter panel is superposed on the second barrier panel midway at a position intermediate or midway of the length thereof and its second transverse end is welded to that barrier panel; the three panels are then superposed and their side edges, one side after the other, are lengthwise welded to provide a sleeve structure with an internal dead-end filter panel located intermediate first and second open ingress and exit ends.

In an embodiment where the first and second fluid-barrier panels are separate panels, the device as indicated, is in sleeve form having a first open ingress opening end and a second open exit end. Where the first and second panels are provided by folding a single long panel in half upon itself, the device is in pouch form having a single open end or ingress end. In a preferred embodiment, the open ingress end prior to side-edge sealing is provided with a cuff or hem by folding the panel open end so that after side-edge sealing the panel and margin defining the open end has 4-ply thickness rather than 2-ply thickness. This gives the structure greater open end strength and also, it is found, enables the device to be easily manipulated at the open ingress end from a two-dimensional closed end shape to a three-dimensional hollow shape suitable as intended for introducing a fluid. The method of sealing end-edge folding, etc. can be carried out in any suitable way and can be done manually or can be automated or semi-automated.

In another preferred embodiment, the invention concerns a plural chamber film filter assembly including 1) a flexible tubular filter device comprising a fluid porous dead end filter panel between first and second polymer film fluid-barrier panels forming together an open-ended fluid-inflatable hollow unitary sleeve or pouch, the filter panel having spaced apart transverse first and second end edges with the first transverse end sealed to the first polymer film panel and with the other transverse end sealed to the second polymer film panel such that the porous panel crosses over from one panel to the other panel whereby the device interior is fluid sealingly partitioned by the filter panel into a first chamber for receiving axial flow of a fluid to be brought into contact with the upstream surface of the filter panel and to pass therethrough and be filtered thereby and a second chamber for receiving the permeate fluid through the downstream surface of the filter panel, the filter having sealed side edges and an end edge defining an open ingress means, and 2) a hollow vessel support member defining a third chamber having rim means forming an opening adapted to receive the filter device therethrough within the third chamber and being adapted to support the thus received filter device upright with said open fluid ingress means uppermost in fluid-sealing relation with said rim means, preferably draped circumferentially thereover, for introducing filterable liquid into the thus supported filter device for filtering the liquid. The assembly preferably comprises pressure control means for establishing fluid pressure in the third chamber that is lower than the fluid pressure in the first chamber such that pressure induced flow of liquid contained in the first chamber through the filter panel into the second chamber is facilitated. Such pressure control means in one embodiment preferably comprises positive pressure fluid intake port means in open communication with the first chamber, for example, means including a cap or closure engageable in sealing relation with the thus draped fluid ingress means which cap or closure may be imperforate or may form a channel, optionally with valve means, affording open communication with fluid under pressure for inflating the first chamber. Such pressure control means in another embodiment preferably comprises negative pressure intake port means for the third chamber in open communication with channel means for drawing a vacuum on the third chamber.

In still another embodiment, the invention concerns a flexible tubular filter device adapted for use as an inner wall liner for a support vessel comprising a fluid porous dead end filter panel between first and second polymer film fluid-barrier panels forming together an open-ended fluid-inflatable hollow unitary sleeve or pouch, the filter device having sealed side edges and unsealed end edges that form an open ingress end, the filter panel having spaced apart transverse first and second end edges with the first transverse edge sealed to the first film panel and with the second transverse edge sealed to the second film panel such that the porous panel crosses over from one panel to the other panel whereby the filter interior is fluid sealingly partitioned by the filter panel into a first chamber for receiving axial flow of a fluid to be brought via the open ingress end into contact with the upstream surface of the filter panel and to pass therethrough and be filtered thereby and a second chamber for receiving the permeate fluid through the downstream surface of the filter panel, said edges of the ingress end when the filter device is supported within a support device being adapted to be spread apart to create a supported open cavity in the first chamber for introducing liquid therein to be filtered, the portion of the second film panel joined to the second transverse edge being formed as a transverse tuck fold such that when the edges of the ingress end are thus spread apart to create a cavity the tuck fold serves to relieve cavity-induced axial tension through the second panel and thereby avoid a strain on the second transverse edge seal.

In yet another preferred embodiment, the invention concerns a plural chamber film filter assembly including 1) a flexible tubular filter device comprising a fluid porous dead end filter panel between first and second polymer film fluid-barrier panels forming together an open-ended fluid-inflatable hollow unitary sleeve or pouch, the filter device having sealed side edges and insealed end edges that form an open ingress end, the filter panel having spaced apart transverse first and second end edges with the first transverse edge sealed to the first film panel and with the second transverse edge sealed to the second film panel such that the porous panel crosses over from one panel to the other panel whereby the filter interior is fluid sealingly partitioned by the filter panel into a first chamber for receiving axial flow of a fluid to be brought via the open ingress end into contact with the upstream surface of the filter panel and to pass therethrough and be filtered thereby and a second chamber for receiving the permeate fluid through the downstream surface of the filter panel, said edges of the ingress end when the filter device is supported within a support device being adapted to be spread apart to create a supported open cavity in the first chamber for introducing liquid therein to be filtered, the portion of the second film panel joined to the second transverse edge being formed as a transverse tuck fold such that when the edges of the ingress end are thus spread apart to create a cavity the tuck fold serves to relieve cavity-induced axial tension especially through the midline of the second panel and thereby avoid a strain on the second transverse edge seal, and 2) a hollow vessel support member comprising a third chamber having rim means forming an opening adapted to receive the filter device therethrough within the third chamber and being adapted to support the thus received filter device upright with said open fluid ingress means uppermost in fluid-sealing relation with said rim means for introducing filterable liquid into the thus supported filter device for filtering the liquid. In a preferred embodiment, the assembly comprises pressure control means for establishing fluid pressure in the third chamber that is lower than the fluid pressure on the first chamber such that pressure-induced flow of liquid contained in the first chamber through the filter panel into the second chamber is facilitated, which means may include positive pressure fluid intake port means in open communication with the first chamber such as valve control means communicating with a positive air pressure supply.

The pressure control means may also include negative pressure intake port means for the third chamber in open communication with means for drawing a vacuum on the third chamber preferably where the hollow vessel support member comprises telescopically engageable tubular members that are operative by expansion to create a vacuum in the third chamber, preferably where the open ingress means of the third chamber is adapted to couple with and receive a liquid sample from a field sampling device such as a liquid bailer device.

BRIEF DESCRIPTION OF THE ILLUSTRATED EMBODIMENTS

The invention in preferred embodiments will now be described in reference to the annexed drawings in which.

DETAILED DESCRIPTION OF THE PREFERRED EMBODIMENTS

Figure 1:
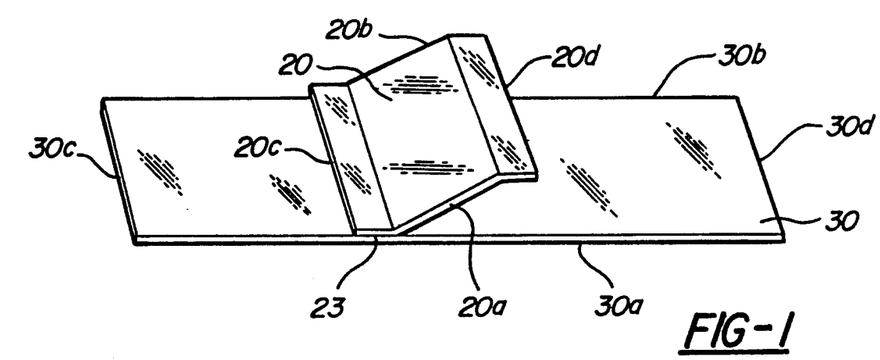
FIG. 1 in perspective illustrates in a filter device a step in the method of welding one transverse edge of a filter panel to a first barrier panel.
Figure 1A:
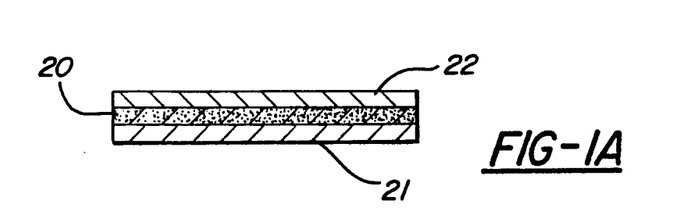
FIG. 1A is a side view of a preferred unitary filter panel having three layers: a membranous or non-membranous filter panel and coextensive facing and backing support panels.
Figure 2:
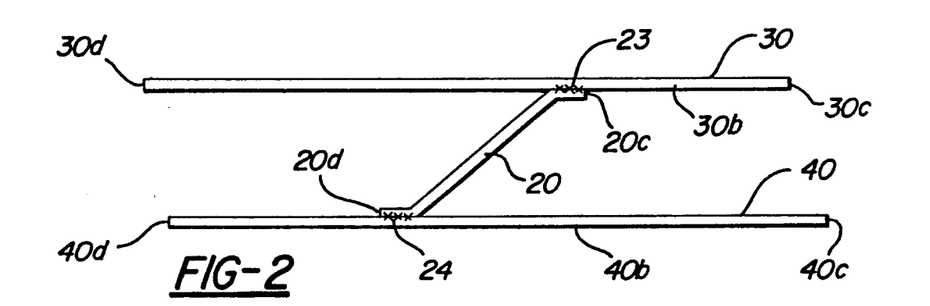
FIG. 2 is a similar illustration showing a second step in the method of welding the opposite transverse edge of the filter panel to a second barrier panel.
Figure 3:
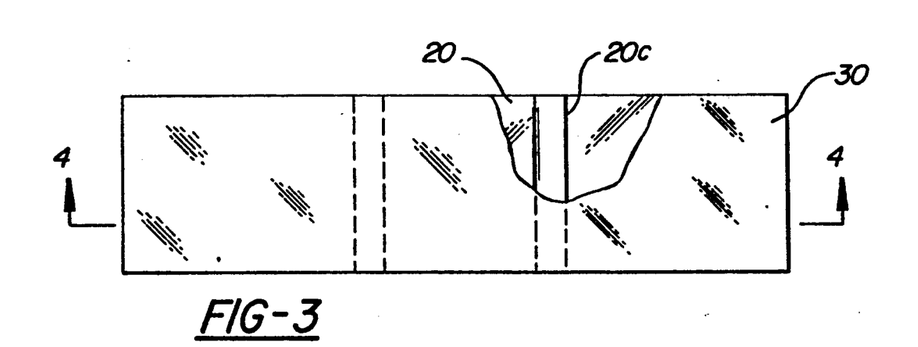
FIG. 3 is a top view of a filter device partly cut away to show the relative lengthwise position of the filter panel when the panels are assembled in sandwich relation.
Figure 4:
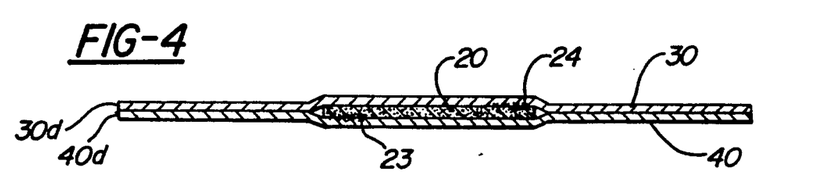
FIG. 4 is a cross sectional view of the filter device taken on line 4—4 of FIG. 3.
Figure 5:
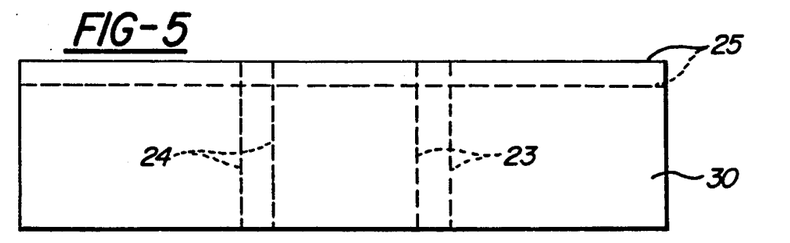
FIGS. 5 and 6 are top views of the device showing successive steps in the method of side edge welding.
Figure 6:
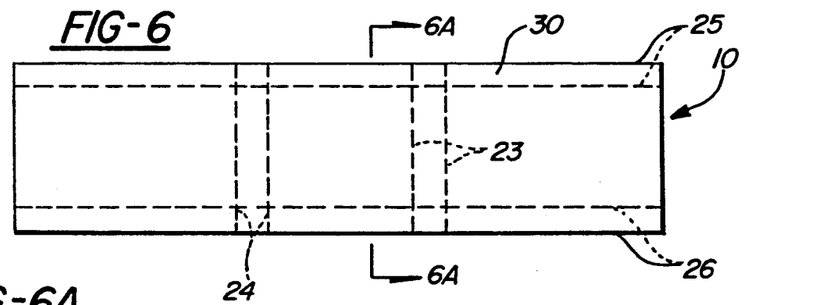
Figures 6A, 6B, 6C, 6D:
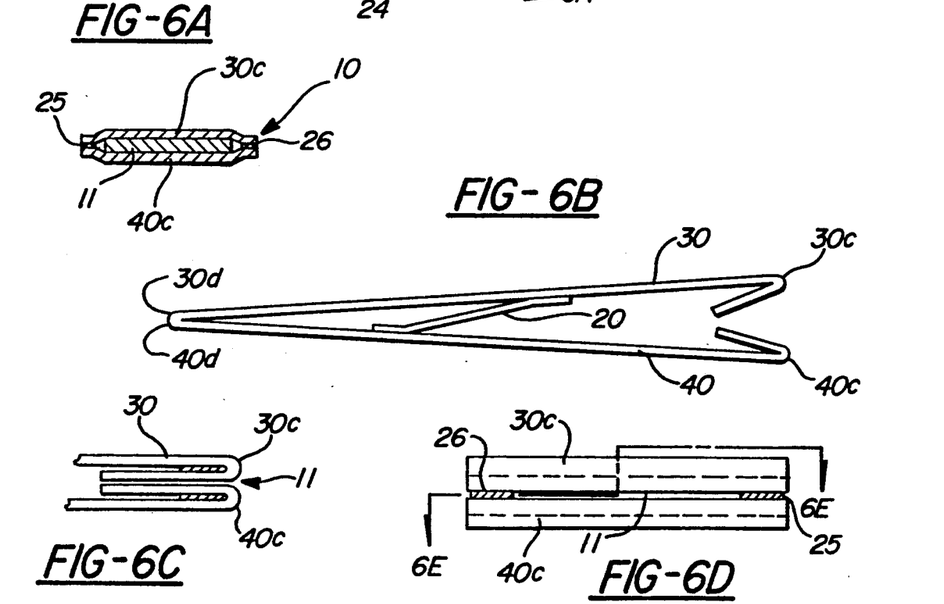
FIG. 6A is an end view in elevation of the device of FIG. 6.
FIG. 6B is a side view similar to FIG. 2 of the panels of the device being assembled.
FIG. 6C is a fragmentary side view of the ingress end of the device.
FIG. 6D is an end view of the ingress end of the device.
Figures 6E, 7, 8:
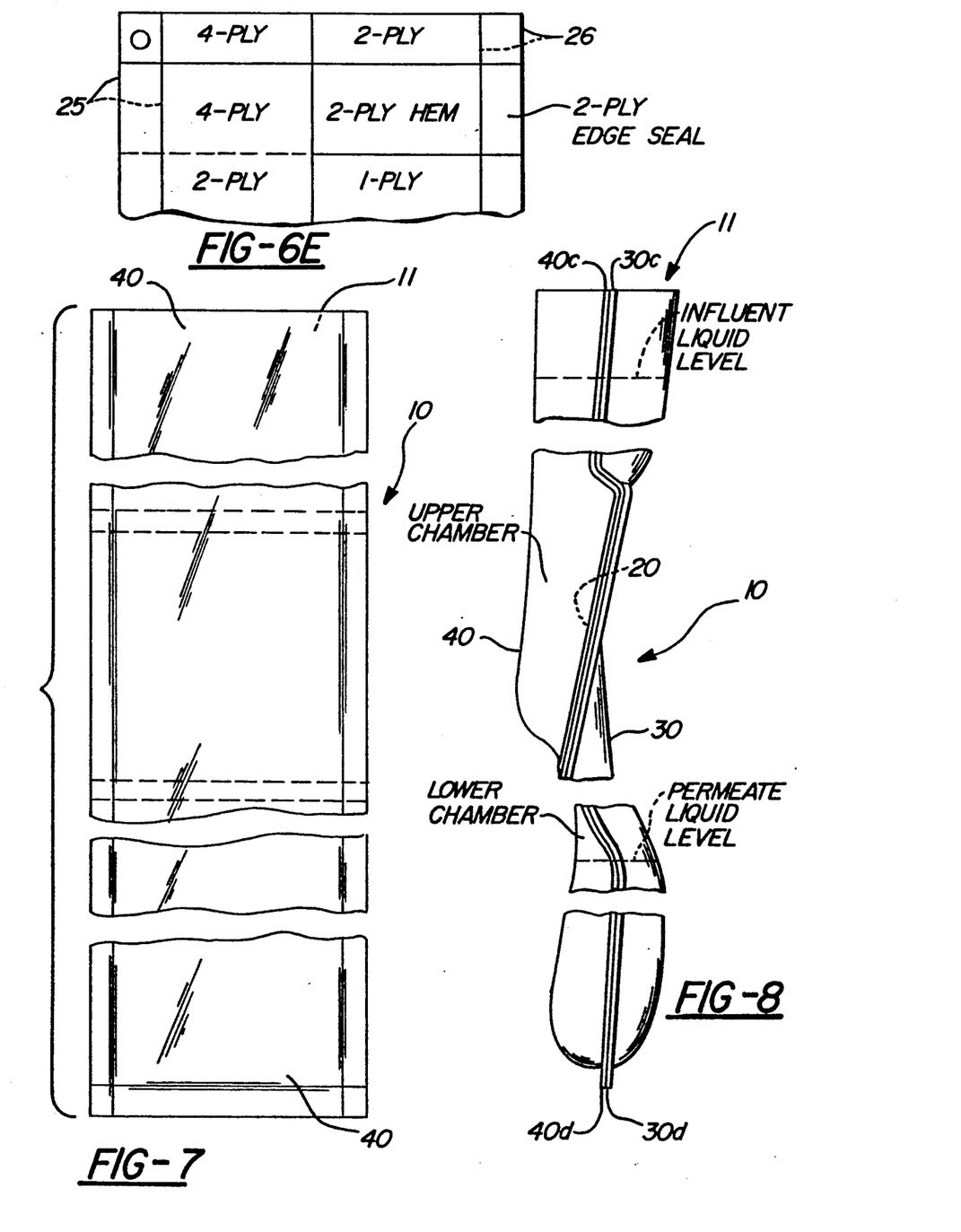
FIG. 6E is a fragmentary plan view of the device taken on lines 6E—6E of FIG. 6D.
FIG. 7 is a fragmented plan view of the filter device in a vertical position in sleeve form open at the top for gravity loading of a liquid and weld sealed at the bottom end edge for collection of filtered liquid.
FIG. 8 is a fragmented side view of the device loaded with unfiltered liquid in the first chamber and with filtered liquid in the second, lower chamber.

The filter device 10 according to a preferred embodiment of the invention as seen in FIGS. 6, 7 and 8 comprises a porous filter panel 20 and first and second polymer film fluid barrier panels 30,40 which preferably are transparent. The filter panel 20 has first and second side edges 20a,20b, and leading and trailing end edges 20c,20d. The barrier panels 30,40 each have respectively first and second side edges 30a,30b/40a,40b and first and second end edges 30c,30d/40c,40d, unitary out-folded cuff panels (not shown) or unitary in-folded hem panels as shown in FIG. 6B. In a preferred embodiment, the barrier panels are in the form of a single long panel as shown in FIG. 6B which may include the just described unitary out- or in-folded cuff or hem panels. The device can be made from conventional materials in any suitable way. As shown in the series of FIGS. 1 to 6, the device in one preferred method can be made from a filter panel and two liquid barrier panels by a 4-cycle weld procedure: 2 transverse welds 23,24 followed by 2 edge-length welds 25,26. In FIG. 1, the filter panel 20 is joined at its leading end edge 20c to the first barrier panel 30 by a transverse seal or weld 23 employing a suitable heat sealing tool or an adhesive seal. The filter panel 20 can comprise one or more membranous (e.g. a microporous polyetnersulfone membrane) or non-membranous (e.g., a fiberglass) filter panels. As an alternative shown in FIG. 1A, it can comprise a facing support 21 and a backing support 22 each being a durable strength material such as a polymer web or fabric. The thus joined parts are turned upside down as shown in FIG. 2 and transverse sealed or welded together at the trailing end edge 20d by weld 24. The three panels 20,30,40 are next brought into superposed alignment as shown in FIGS. 3 and 4. The assembly is then edge welded first at 25 in FIG. 5 and then at 26 in FIG. 6 thus leaving open-ended the fluid ingress 11 opening of FIG. 6A between the film layer panel ends 30c, 40c and (not shown) panel ends 30d,40d.

The filter device 10 can be sealed or welded at one end to form a sleeve as shown in FIG. 7 or can be sealed at both ends to form a sealed pouch, preferably in sterilized packaged form. For the further processing of the preferred embodiment shown in FIG. 6B, prior to edge sealing, the hem panels are brought to the fully folded position shown in FIG. 6C and are end sealed leaving an ingress opening 11 after edge sealing as shown in FIG. 6D.

FIG. 6E shows the preferred embodiment of the open end of the device having a hemmed opening 11 with 4-plies. As shown, suspension or perforation means are provided in this multi-ply strengthened portion, by means of which suspension means the device can be held and supported vertically, e.g., through use of an S-hook or other support means attached or anchored to a stationary support. For filtering a liquid as shown in FIG. 8, the device can conveniently be held vertically and the liquid introduced through the open end 11 to cause the upper chamber to be filled and, being flexible, to balloon out in contact with the filter panel 20. When using transparent barrier film material, the progress of liquid flow in the device can readily be followed. The liquid thus can be seen to pass through the filter panel (under pressure of gravity) into the lower chamber and form there a body of permeate liquid. If desired, to increase the downstream pressure, the open end 11 can be sealed by clamping and the upper chamber advantageously can be compressed manually (or by other means such as by pressure between opposed rollers) to correspondingly increase the filtration flow rate of the liquid. Following filtration, the liquid filtrate can be transferred to a different container or can be stored under seal in the lower chamber or processed further. Also, if desired, the device, being of thin film construction, can be cut (e.g., with scissors or other suitable means) as transverse sections of those segments of the device which are to be retained, e.g., for microbial analysis, colony counting, sampling, etc., such as the filter panel itself or, as indicated, the lower chamber with its liquid content. In cases where the device comprises two or more axially spaced apart filter panels, these can each be cut out and saved separately.

Figure 9:
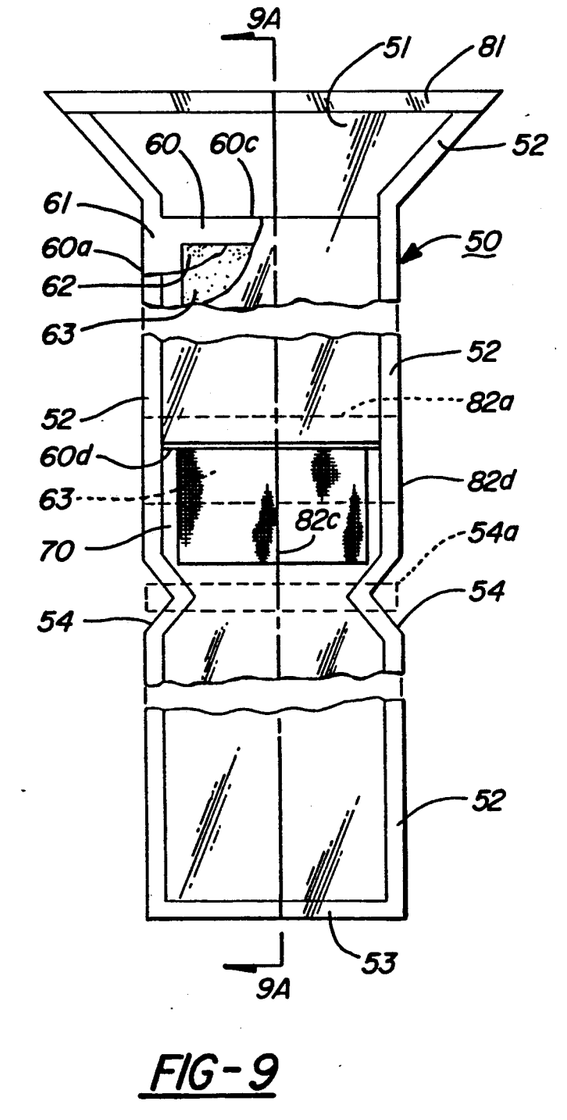
FIG. 9 is a fragmented view of a preferred embodiment of a filter device having a transverse tuck fold.
Figure 9A:
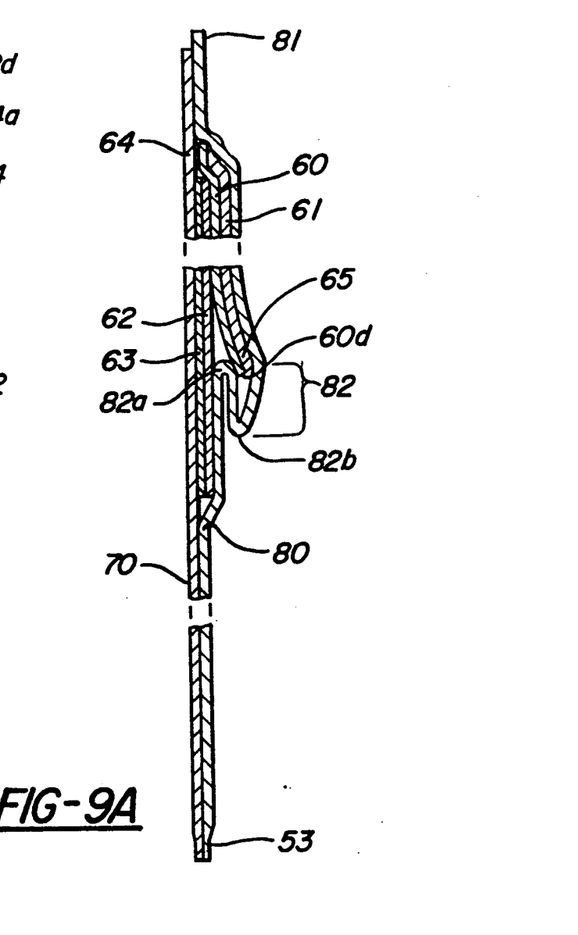
FIG. 9A is a cross-section view of the device of FIG. 9 taken on line 9A—9A.

The filter device 50 according to a preferred embodiment shown in FIGS. 9 and 9A comprises first and second polymer film fluid barrier panels 70,80 (which preferably are transparent), a porous filter panel 60, a prefilter panel 61, a support panel 62, and an open mesh panel 63. In a preferred embodiment, the filter device is in pouch form which at one end has a flat or 2-dimensional fan shape collar 51 formed by the panels 70,80 of which panel 80 has an overlap portion 81 that serves to facilitate grasping the panel ends and spreading them apart as shown by the arrows in FIG. 10 to expose an enlarged opening 51a for introducing fluid into the device. The filter device also can be in sleeve form, i.e., with opposite ends open (either unsealed or sealed by taping or clamping to be opened as desired). The filter device preferably has a transverse narrow portion 54 designed to accommodate external application of a closure or clip 54a (shown in phantom outline for the purpose of separating the device into upper and lower compartments. The margins of the barrier panels 70,80 are sealed at the side edges 52 and end edge 53 and the side edges 60a of the porous filter panel 60 and the prefilter panel are joined with the side margins of the barrier panels 70,80 in a common seal. The filter panel 60 is joined to the barrier panels by transverse seals 64,65 by crossing over at the leading edge 60c from panel 70 to panel 80 at the trailing edge 60d. In a preferred embodiment as shown in FIGS. 9 and 9A the barrier panel 80 of the filter device comprises a tuck fold 82 having upper and lower folds 82a,82b and also having its side margins 82d sealed with the side seals 52.

According to a preferred embodiment, the invention concerns a filter assembly comprising a filter device as described, e.g., the illustrated filter devices 10,50, and a support vessel member 90 as shown in FIGS. 11-14. The support vessel member 90 in one preferred embodiment (FIG. 11) is cylindrical in form and has a rim 91 forming a round opening 91a, a base 92, and an exit or vacuum port 93. The support vessel member in another preferred embodiment (FIG. 14), also cylindrical in form, has cooperating telescopically engageable barrel parts 90a,90b, a vessel rim 91 forming a round opening 91a, a base 92, an exit or egress port 93, and a port closure.

Figure 10:
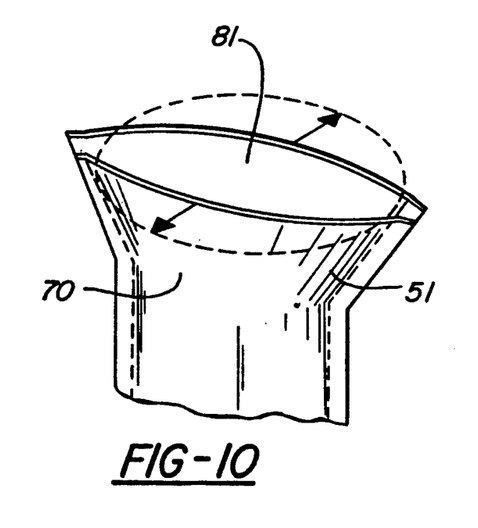
FIG. 10 is a fragmentary view of the manner of opening the edges of the open end of the device of FIG. 9.
Figure 10A:
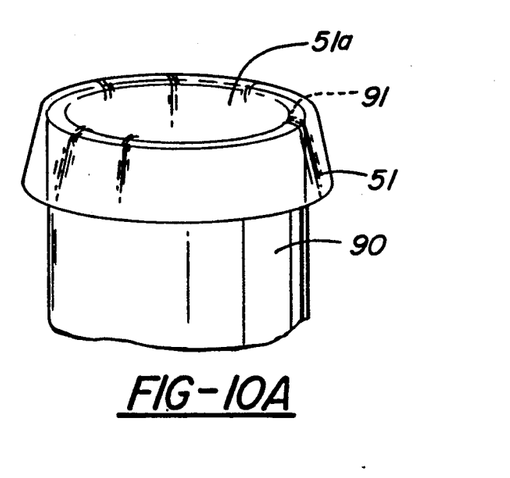
FIG. 10A is a fragmentary view in perspective showing the open end of a film filter device draped for support over the rim of a tubular support member.
Figures 11, 13:
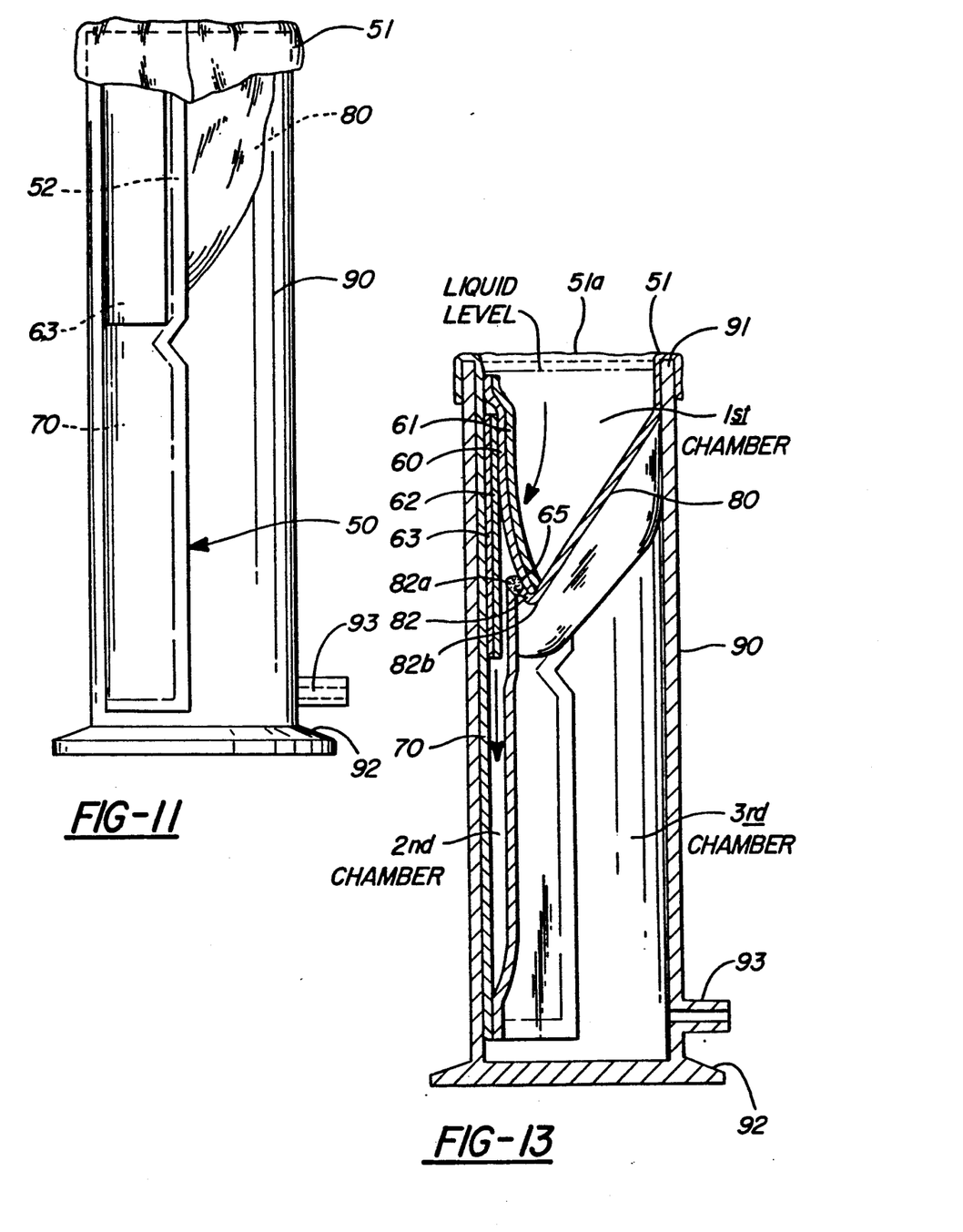
FIG. 11 is a fragmented side view and FIG. 12 is a top view of a filter device inserted as a rim supported liner in a tubular support member.
FIG. 13 is a cross-sectional view of the supported filter device taken on line 13—13 of FIG. 12.
Figure 12:
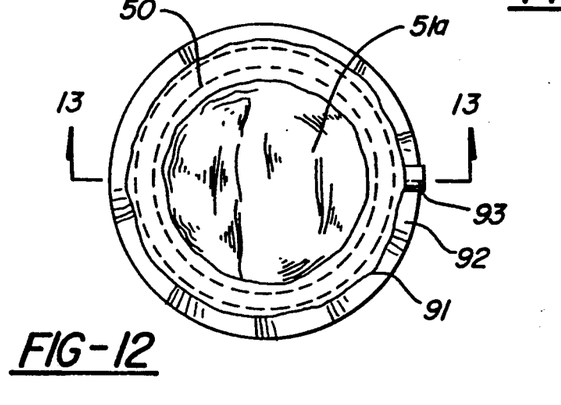
Figure 14:
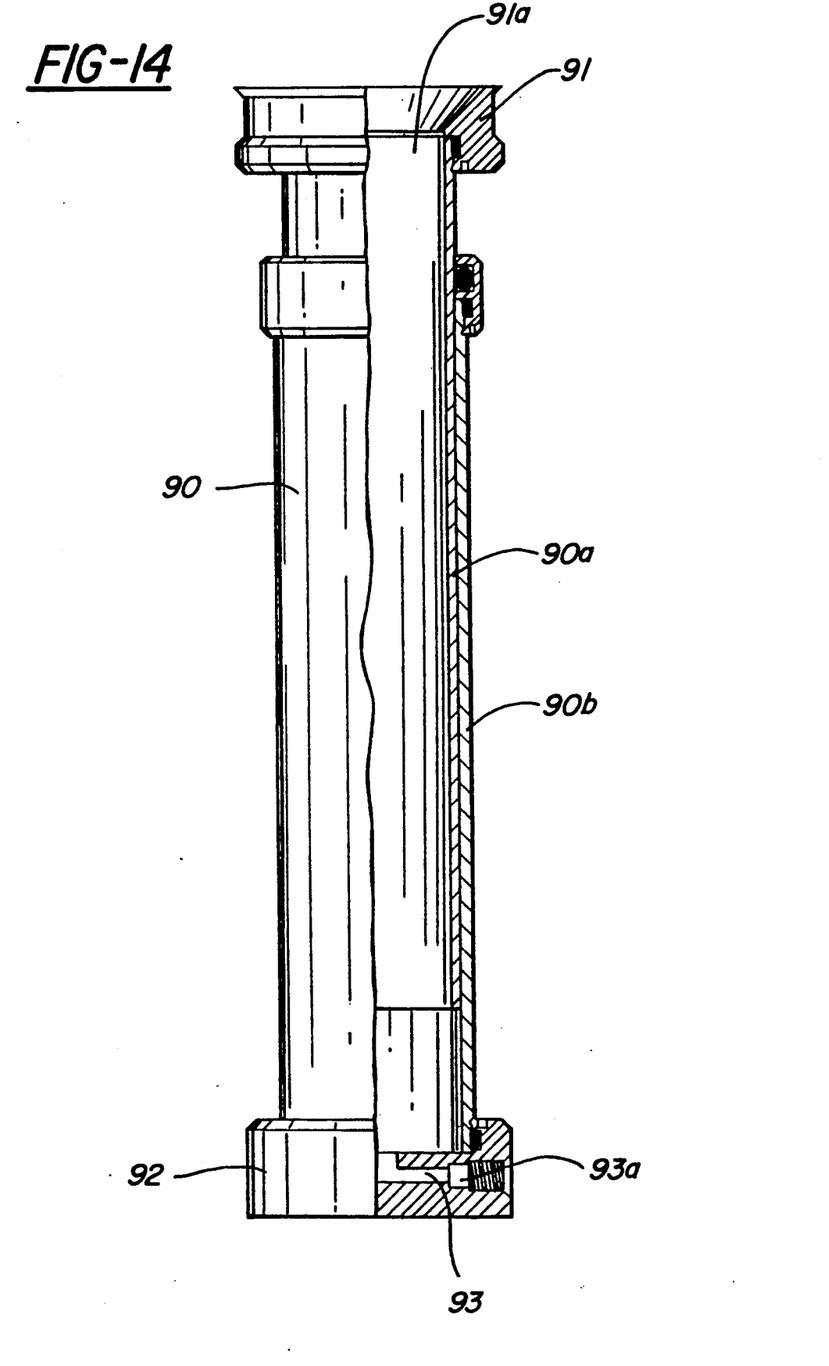
FIG. 14 is a side elevational view partly in diametral cross-section of a preferred embodiment of a filter device support member comprising telescopically engaged tubular parts that are co-operable to produce a vacuum for inflation of an inflatable film panel filter device.

For the filtration of liquid such as aqueous liquid containing particulates, bacteria, etc., the filter device 50 is inserted lengthwise into the support vessel 90, the fan shape collar 51 is opened as shown in FIG. 10, and is draped over the rim 91 of the vessel as shown in FIGS. 10A, and 12. The liquid is then introduced into the thus opened first chamber as shown in FIGS. 11 and 13. As is seen by comparison of FIG. 9A and FIG. 13, the introduced liquid causes the first chamber to balloon out, and this in turn places a stress on the lower transverse seal 65 of the filter panel 60, especially at the midline 82c thereof (FIG. 9). However, the tuck fold, in response, partly unfolds at the midline (as seen in FIG. 13) and thereby advantageously dissipates or relieves the stress which might otherwise damage the transverse seal.

The liquid contained in the first chamber under gravity flow passes through the prefilter and filter panels in the direction shown by the arrows (FIG. 13) and enters the second chamber as filtered liquid free of particulates, bacteria, etc. Where the device is in pouch form, the thus collected liquid can be harvested by removing the device from the support vessel and either can be used immediately, e.g., by cutting open the second chamber at the narrow transverse portion 54 for dispensing or can be held until needed, e.g., by clamping the second chamber at the same transverse portion with a laboratory clamp such as a Spectra/Por ® closure.

Figure 10B:
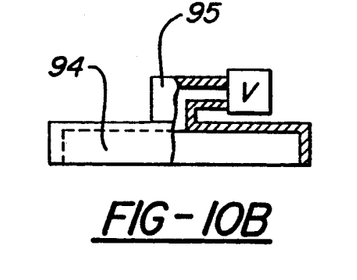
FIGS. 10B and 10C are side views, partly in diametral cross-section, of circular cap members or closures that are telescopically engageable with an open end of a support member of the type shown in FIG. 10A. The cap members serve to close the open end thereby secure the draped end of a film filter device sealingly upon the rim of the tubular support member, each cap member having a central aperture, respectively, for communication with an air pressure supply, and for reception of a delivery tube of a liquid sampling device.
Figure 10C:
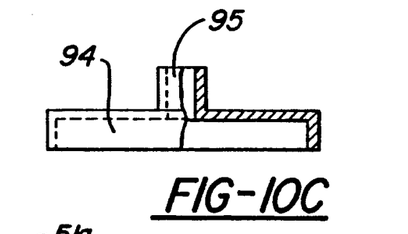

To increase the liquid filtration flow rate in a preferred embodiment, a cap 94 (FIGS. 10B and 10C) or other suitable closure is provided which fits sealingly in exterior telescopic engagement with the draped rim (FIG. 10A) of the support vessel. The cap 94 includes a fluid supply port 95 through which compressed air can be introduced by way of the valve and support port into the headspace above the liquid contained in the first chamber such that the internal chamber pressure becomes greater than the pressure in the third chamber whereby the liquid filtration rate is correspondingly increased. Alternatively, the same increase in liquid filtration rate can be achieved by drawing a vacuum in the third chamber by way of the vacuum port 93 from a vacuum source (not shown). Where an external vacuum source is not readily available, the filter device may be used with the support vessel 90 shown in FIG. 14, to filter liquid under vacuum. For such use, the filter device in pouch form is inserted lengthwise into the support vessel, the collar 51 is opened and is draped over the rim 91 of the vessel to provide a fluid ingress opening 91a. The liquid sample for filtration is introduced through the opening into the first chamber, and the lower barrel part 90b with the port 93a closed is displaced or telescoped away from the upper barrel part 90a so that a vacuum is created in the barrel (i.e., the third chamber) so that the liquid filtration rate through the filter panel into the second chamber is increased correspondingly. In the preferred embodiment for introduction of the liquid sample, the upper barrel part 90a comprises a rim 91 of the type shown in FIG. 13 and a cap shown in FIG. 10C sealingly telescoped onto the rim end whereby the open ingress means 95 of the cap can be coupled with a conventional field sampling device for liquid such as a liquid bailer device (nor shown), e.g., a Norwell ® bailer. Vacuum filtration of aqueous samples through a microporous filter by these means, it is found, is typically effective to reduce the filtration time from one-half hour under gravity flow to about 1 to 5 minutes under vacuum induced flow.

Where the filter assembly employs a device in sleeve form, the operation is the same except that the assembly comprises the first chamber and the vessel chamber or third chamber in which latter chamber the filter liquid is collected rather than in a second chamber (as would be present in a pouch form device).

What is desired to claim as our exclusive property in the invention, as described, is the following:

1. A plural chamber film filter assembly including 1) a flexible tubular filter device comprising a fluid porous dead end filter panel between first and second polymer film fluid-barrier panels forming together an open-ended fluid-inflatable hollow unitary sleeve or pouch, the filter panel having spaced apart transverse first and second end edges with the first transverse end sealed to the first polymer film panel and with the other transverse end sealed to the second polymer film panel such that the porous panel crosses over from one panel to the other panel whereby the device interior is fluid sealingly partitioned by the filter panel into a first chamber for receiving axial flow of a fluid to be brought into contact with the upstream surface of the filter panel and to pass therethrough and be filtered thereby and a second chamber for receiving the permeate fluid through the downstream surface of the filter panel, the filter having sealed side edges and an end edge defining an open ingress means, and 2) a hollow vessel support member defining a third chamber having rim means forming an opening adapted to receive the filter device therethrough within the third chamber and being adapted to support the thus received filter device upright with said open fluid ingress means uppermost in fluid-sealing relation with said rim means for introducing filterable liquid into the thus supported filter device for filtering the liquid.

2. An assembly according to claim 1 comprising pressure control means for establishing fluid pressure in the third chamber that is lower than the fluid pressure in the first chamber such that pressure induced flow of liquid contained in the first chamber through the filter panel into the second chamber is facilitated.

3. An assembly according to claim 2 where the pressure control means comprises positive pressure fluid intake port means in open communication with the first chamber.

4. A film filter assembly according to claim 3 where the port means comprises valve control means accessible to a positive air pressure supply.

5. An assembly according to claim 2 where the pressure control means comprises negative pressure intake port means for the third chamber in open communication with means for drawing a vacuum on the third chamber.

6. A film filter assembly according to claim 5 where the hollow vessel support member comprises telescopically engageable tubular members that are operative by expansion to create a vacuum in the third chamber.

7. A film filter assembly according to claim 6 where the open ingress means is adapted to couple with and receive a liquid sample from a field sampling device.

8. A film filter assembly according to claim 7 where the sampling device is a liquid bailer device.

9. The filter assembly of claim 1 wherein the open ingress means comprises a fan shaped open ingress end.

10. A flexible tubular filter device adapted for use as an inner wall liner for a support vessel comprising a fluid porous dead end filter panel between first and second polymer film fluid-barrier panels forming together an open-ended fluid-inflatable hollow unitary sleeve or pouch, the filter device having sealed side edges and unsealed end edges that form an open ingress end, the filter panel having spaced apart transverse first and second end edges with the first transverse edge sealed to the first film panel and with the second transverse edge sealed to the second film panel such that the porous panel crosses over from one panel to the other panel whereby the filter interior is fluid sealingly partitioned by the filter panel into a first chamber for receiving axial flow of a fluid to be brought via the open ingress end into contact with the upstream surface of the filter panel and to pass therethrough and be filtered thereby and a second chamber for receiving the permeate fluid through the downstream surface of the filter panel, said edges of the ingress end when the filter device is supported within a support device being adapted to be spread apart to create a supported open cavity in the first chamber for introducing liquid therein to be filtered, the portion of the second film panel joined to the second transverse edge being formed as a transverse tuck fold such that when the edges of the ingress end are thus spread apart to create a cavity the tuck fold serves to relieve cavity-induced axial tension through the second panel and thereby avoid a strain on the second transverse edge seal.

11. The filter device of claim 10 having a fan shaped open ingress end.

12. The filter device of claim 11 for use with a support vessel having a rim forming a top opening where the device is insertable as a liner within the vessel and is adapted to be supported therein by draping the peripheral portion of the open ingress end circumferentially over the vessel rim.

13. The filter device of claim 10 for use with a support vessel having a rim forming a top opening where the device is insertable as a liner within the vessel and is adapted to be supported therein by draping the peripheral portion of the open ingress end circumferentially over the vessel rim.

14. A plural chamber film filter assembly including 1) a flexible tubular filter device comprising a fluid porous dead end filter panel between first and second polymer film fluid-barrier panels forming together an open-ended fluid-inflatable hollow unitary sleeve or pouch, the filter device having sealed side edges and unsealed end edges that form an open ingress end, the filter panel having spaced apart transverse first and second end edges with the first transverse edge sealed to the first film panel and with the second transverse edge sealed to the second film panel such that the porous panel crosses over from one panel to the other panel whereby the filter interior is fluid sealingly partitioned by the filter panel into a first chamber for receiving axial flow of a fluid to be brought via the open ingress end into contact with the upstream surface of the filter panel and to pass therethrough and be filtered thereby and a second chamber for receiving the permeate fluid through the downstream surface of the filter panel, said edges of the ingress end when the filter device is supported within a support device being adapted to be spread apart to create a supported open cavity in the first chamber for introducing liquid therein to be filtered, the portion of the second film panel joined to the second transverse edge being formed as a transverse tuck fold such that when the edges of the ingress end are thus spread apart to create a cavity the tuck fold serves to relieve cavity-induced axial tension through the second panel and thereby avoid a strain on the second transverse edge seal, and 2) a hollow vessel support member comprising a third chamber having rim means forming an opening adapted to receive the filter device therethrough within the third chamber and being adapted to support the thus received filter device upright with said open fluid ingress means uppermost in fluid-sealing relation with said rim means for introducing filterable liquid into the thus supported filter device for filtering the liquid.

15. An assembly according to claim 14 comprising pressure control means for establishing fluid pressure in the third chamber that is lower than the fluid pressure in the first chamber such that pressure-induced flow of liquid contained in the first chamber through the filter panel into the second chamber is facilitated.

16. An assembly according to claim 15 where the pressure control means comprises positive pressure fluid intake port means in open communication with the first chamber.

17. A film filter assembly according to claim 16 where the port means comprises valve control means accessible to a positive air pressure supply.

18. An assembly according to claim 15 where the pressure control means comprises negative pressure intake port means for the third chamber in open communication with means for drawing a vacuum on the third chamber.

19. A film filter assembly according to claim 18 where the hollow vessel support member comprises telescopically engageable tubular members that are operative by expansion to create a vacuum in the third chamber.

20. A film filter assembly according to claim 19 where the open ingress means is adapted to couple with and receive a liquid sample from a field sampling device.

21. A film filter assembly according to claim 20 where the sampling device is a liquid bailer device.

* * * * *

UNITED STATES PATENT AND TRADEMARK OFFICE
CERTIFICATE OF CORRECTION

PATENT NO. : 5,200,073
DATED : April 6, 1993
INVENTOR(S) : Steere et al It is certified that error appears in the above-identified patent and that said Letters Patent is hereby corrected as shown below:

Column 5, line 27, delete "insealed" and insert --unsealed--

Column 7, line 41, delete "polyetnersulfone" and insert --polyethersulfone--;

Column 9, line 68, delete "nor shown" and insert --not shown--.

Signed and Sealed this

Twenty-eighth Day of December, 1993

Attest:

BRUCE LEHMAN

*Attesting Officer*  *Commissioner of Patents and Trademarks*